No. 732,599. PATENTED JUNE 30, 1903.
L. STEINBERGER.
TURNBUCKLE STRAIN.
APPLICATION FILED FEB. 24, 1903.

NO MODEL.

WITNESSES:
Edward Thorpe
Walton Harrison

INVENTOR
Louis Steinberger
BY
ATTORNEYS.

No. 732,599. Patented June 30, 1903.

UNITED STATES PATENT OFFICE.

LOUIS STEINBERGER, OF NEW YORK, N. Y.

TURNBUCKLE-STRAIN.

SPECIFICATION forming part of Letters Patent No. 732,599, dated June 30, 1903.

Application filed February 24, 1903. Serial No. 144,564. (No model.)

*To all whom it may concern:*

Be it known that I, LOUIS STEINBERGER, a citizen of the United States, and a resident of the city of New York, borough of Brooklyn, in the county of Kings and State of New York, have invented a new and Improved Turnbuckle-Strain, of which the following is a full, clear, and exact description.

My invention relates to mechanism for suspending electric conductors, my more particular object being to produce a turnbuckle-strain of great tensile strength and which will so distribute the mechanical stress as to subject the weaker parts of the strain to a minimum danger of breaking.

Reference is to be had to the accompanying drawings, forming a part of this specification, in which similar characters of reference indicate corresponding parts in all the figures.

Figure 1:
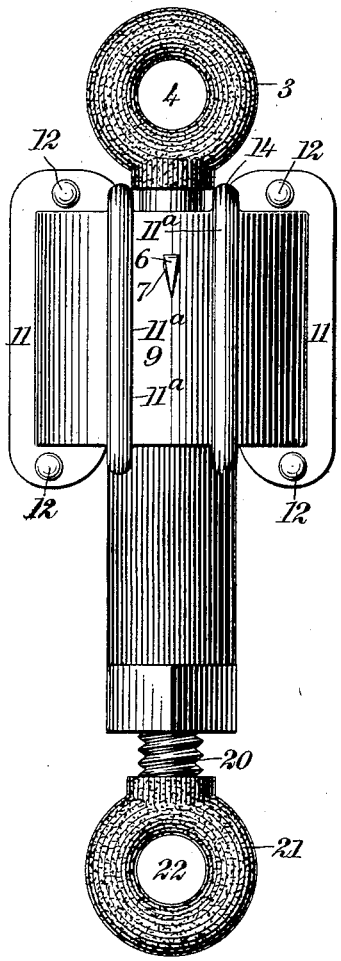
Figure 2:
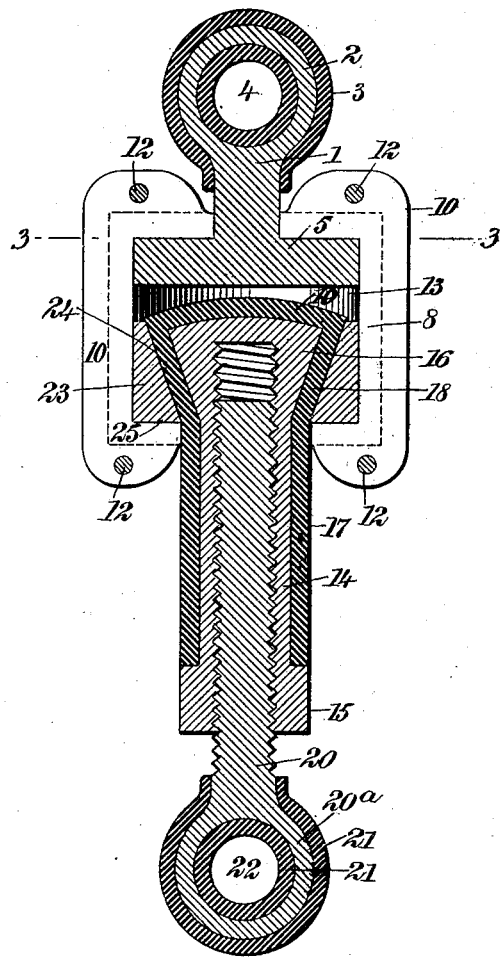
Figure 3:
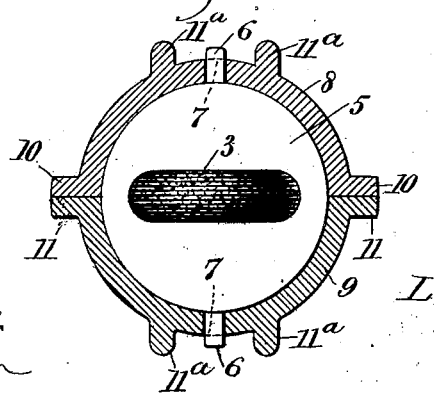

Figure 1 is a plan view of a strain embodying my invention. Fig. 2 is a central longitudinal section through the same. Fig. 3 is a horizontal section upon the line 3 3 of Fig. 2 looking toward the lower end of the figure, the insulation 3 of the eye 2 not being removed.

A bolt 1 is provided with an eye 2, which is covered with insulating material 3, so as to leave a central opening 4, as indicated in Figs. 1 and 2. Mounted integrally upon the bolt 1 is a head 5, which is provided with tongues 6, of malleable material, projecting through slots 7 in a two-part casing and capable of being headed down, as indicated in Fig. 1. The two-part casing is made of the halves 8 9 and is provided for the purpose of connecting together several of the parts. This casing is provided with flanges 10 11, connected together by means of bolts 12, whereby the two halves may be taken apart or secured together at will. The head 5 fills the upper end of the casing, so as to leave a cylindrical space 13, as indicated in Fig. 2. The two halves of the casing are each provided with ribs 11ª, integral therewith, for the purpose of conferring strength upon the casing. A sleeve 14 is threaded internally, as shown in Fig. 2, and is provided with an angular portion 15, whereby the same may be rotated by means of a wrench in the usual manner. This sleeve is provided integrally with a head 16 of substantially conical shape, this head and the body portion 14 of the sleeve being covered by insulation, of which the portion 17 is cylindrical and the portion 18 is of substantially conical shape, as indicated in Fig. 2.

The insulating member is provided with a convex end 19 of the shape indicated, this end being integral with the portions 17 and 18. A threaded bolt 20 normally engages the threaded sleeve 14 and is provided with an eyebolt 20ª, which is covered by the insulation 21, so as to leave a central aperture 22.

Disposed within the casing and free to revolve relatively thereto is an annular bearing member 23, provided with a concave bearing-face 24 of substantially conical form and also with a flat bearing-face 25, which rests directly within the bottom of the casing and is free to move relatively thereto. The bearing member 23 sustains the mechanical tension of the device, the head 18 of the insulating member 17 fitting neatly within the concave conical bearing-surface 24. The revoluble movement of the sleeve 14, whether due to the rotation of the nut 15 or not, causes the insulating-shell 18 to slip upon the concave surface 24 or else causes the entire bearing-surface 25 of the annular bearing member 23 to slide upon the bottom of the casing. The result is that not only the insulations 17, 18, and 19 but the other parts are subjected to a minimum of stress.

The device is self-adjusting for several reasons. The casing being made in halves allows the head 5 to adjust itself slightly according to the relative positions of the two halves of the casing—that is to say, if the two halves of the casing should be slightly awry or if the interior of the casing should be somewhat rough or uneven the head 5, having a slight movement notwithstanding the action of the tongues 6, will gradually settle into such a position relatively to the casing so as to distribute the strain as nearly equally as possible. The annular bearing member 23 is likewise free to adjust itself according to the relative positions occupied by the two halves of the casing. The head 16, covered by the substantially conical portion 18 and the rotund portion 19, must necessarily conform to its environment, and therefore adjust itself to the bearing member 23.

Should this member be slightly awry, owing to an imperfect fit of the two halves of the casing, the member 23 will nevertheless settle itself in some position offering a minimum of strain upon the insulation and other parts.

The dielectric or insulating qualities of the device are necessarily very great, for the reason that it is provided with triple insulation—that is to say, each end of the strain is insulated separately and the two ends are insulated from each other by a dielectric placed substantially in the middle.

It will be noted that when the sleeve 14 is rotated, either in order to take up the slack in the wire or cable or from any other cause, the grinding or abrading will normally be borne by the smooth bottom surface of the casing and the surface 25 of the annular bearing-ring. Still as the head 16, covered with the insulation 18, is free to move relatively to the bearing-surface 24 no breakage can occur in case the annular surface 25 should happen to stick upon the lower internal surface of the casing.

It has heretofore been customary when it is desired to secure double or triple insulation to connect together two separate devices—for instance, a turnbuckle and a globe-strain and sometimes a turnbuckle and two globe-strains. This, of course, secures good insulation; but it makes the apparatus complicated, expensive, and cumbersome and withal of considerable weight.

As shown in my invention, it is possible to effect a multiple insulation by the use of a device which has but little more complication than an ordinary mechanical turnbuckle. The greater the strain upon the end 18 of the insulation the more securely will the insulation be crowded toward the head 16, and thereby prevented from breaking. In fact, a limit of the tensile strength of this strain is the crushing-point of the insulation 18.

Having thus described my invention, I claim as new and desire to secure by Letters Patent—

1. A turnbuckle-strain, comprising a casing, a member connected therewith and provided with an eye, insulation enveloping said eye, a bearing member mounted within said casing, and suspension mechanism revolubly connected with said bearing member and insulated therefrom.

2. A turnbuckle-strain, comprising a casing, a member connected therewith and provided with an eye, insulation enveloping said eye, a bearing member mounted within said casing, having a substantially conical concave inner surface and outer bearing-surfaces, and suspension mechanism revolubly connected with said bearing member and insulated therefrom.

3. A turnbuckle-strain, comprising a casing provided with slots, a head mounted within said casing and provided with malleable tongues for engaging said slots, a bearing member mounted within said casing, and suspension mechanism having a head disposed within said casing for engaging said bearing member.

4. A turnbuckle-strain, comprising a casing provided with slots, a head mounted within said casing and provided with malleable tongues for engaging said slots, a bearing member having a substantially conical concave inner surface and outer bearing-surfaces, mounted within said casing, and suspension mechanism having a head disposed within said casing for engaging said bearing member.

5. A turnbuckle-strain, comprising a casing, a head mounted therein and provided with an eye, insulation covering said eye, an annular bearing member disposed within said casing and free to revolve relatively thereto, said annular bearing member being provided with a concave inner bearing-surface of substantially conical form, a sleeve disposed within said casing and provided with a head of substantially conical form, an insulating-shell mounted rigidly upon said sleeve and encircling said head, said shell being free to revolve relatively to said annular bearing member, and a supporting member for engaging said sleeve, a portion of said supporting member having a covering of insulating material.

6. A turnbuckle-strain, comprising a casing, a head mounted therein and provided with an eye, normally projecting from said casing, an annular bearing member disposed within said casing and free to revolve relatively thereto, said bearing member being provided with a concave bearing-surface of substantially conical form, a sleeve disposed partially within said casing and provided with a head of substantially conical form, a shell of insulating material mounted rigidly upon said sleeve and encircling said head, said shell being free to revolve relatively to said annular bearing member, an eyebolt for engaging said sleeve, and an insulating member engaging said eyebolt.

7. A turnbuckle-strain, comprising a casing, a head mounted therein and provided integrally with an eye, insulation covering said eye, an annular bearing member disposed within said casing and free to revolve relatively thereto, said annular bearing member being provided with a concave bearing-surface of substantially conical form, a sleeve disposed within said casing, and provided with a head of substantially conical form, an insulating-shell mounted rigidly upon said sleeve, and encircling said head, said shell being free to revolve relatively to said annular bearing member, and means for supporting said sleeve.

8. A turnbuckle-strain, comprising a casing provided with an eye for sustaining the same, a metallic member mounted within said casing and free to move relatively thereto, said metallic member being provided with a substantially conical concave inner surface and outer bearing-surfaces, and suspension mechanism provided with an insulated convex surface mating said concave surface of said metallic member.

9. A turnbuckle-strain, comprising a casing, means for sustaining the same, a metallic member mounted within said casing and free to move relatively thereto, said metallic member being provided with a substantially conical concave inner surface and with an annular bearing-surface disposed in a plane at right angles to the direction of strain, said annular bearing-surface engaging the inner surface of said casing, and suspension mechanism provided with an insulated convex surface mating said concave surface of said metallic member.

10. A turnbuckle-strain, comprising a casing, means for sustaining the same, a metallic member mounted within said casing and free to move relatively thereto, said metallic member being provided with a substantially conical concave inner surface and outer bearing-surfaces, and suspension mechanism provided with an insulated convex surface mating said concave surface of said metallic member.

11. A turnbuckle-strain, comprising a casing, means for sustaining the same, a metallic member mounted within said casing, and free to move relatively thereto, said metallic member being provided with a substantially conical concave inner surface and outer bearing-surfaces, an insulated member having an enlarged head of substantially conical convex form for engaging said substantially conical concave inner surface of said metallic member, and suspension mechanism connected with said insulated member.

12. A turnbuckle-strain, comprising a casing, means for sustaining the same, a metallic member mounted within said casing, and free to move relatively thereto, said metallic member being provided with a concave surface, and outer bearing-surfaces, an insulated member having an enlarged head of convex form for engaging said concave surface, and suspension mechanism connected with said insulated member.

13. A turnbuckle-strain, comprising a casing made in halves and normally secured together, an annular metallic member mounted within said casing and free to move relatively thereto, and provided with a substantially conical concave inner surface and outer bearing-surfaces, and insulated suspension mechanism provided with a head having a substantially conical convex surface for engaging said substantially conical concave inner surface of said annular member.

14. A turnbuckle-strain, comprising a casing made in halves and normally secured together, an annular metallic member mounted within said casing and free to move relatively thereto, and provided with a substantially conical concave inner surface and outer bearing-surfaces, and insulating suspension mechanism provided with a head having a substantially conical convex surface for engaging said substantially conical concave surface of said annular metallic member.

15. A turnbuckle-strain, comprising a casing, a member connected therewith and provided with an eye, a metallic bearing member mounted within said casing, screw mechanism provided with a bearing member for engaging said metallic bearing member within said casing, and also provided with an eye, and insulating material engaging said eyes.

16. A turnbuckle-strain, comprising a casing, a member connected therewith and provided with an eye, a metallic bearing member mounted within said casing, having a substantially conical concave inner surface and outer bearing-surfaces, a screw mechanism provided with a bearing member for engaging said bearing member within said casing, and also provided with an eye, and insulating material engaging said eyes.

17. A turnbuckle-strain, comprising a casing made in halves, each of said halves being provided with ribs integral therewith for the purpose of strengthening the same, an annular metallic bearing member mounted within said casing, and free to move relatively thereto, having a substantially conical concave inner surface and outer bearing-surfaces, suspension mechanism provided with a portion for engaging said annular metallic bearing member, and mechanism connected with said casing for suspending the same.

18. A turnbuckle-strain, comprising a casing, a metallic bearing member mounted therein and free to move relatively thereto, a threaded sleeve provided with insulation for engaging said metallic bearing member, a threaded bolt for engaging said sleeve and provided with an eye, a member connected with said casing and provided with an eye, and insulating material engaging said eyes.

19. A turnbuckle-strain, comprising a casing, a metallic bearing member having a substantially conical concave inner surface and outer bearing-surfaces mounted therein and free to move relatively thereto, a threaded sleeve provided with insulation for engaging said metallic bearing member, a threaded bolt for engaging said sleeve and provided with an eye, a member connected with said casing and provided with an eye, and insulating material engaging said eyes.

20. A turnbuckle-strain, comprising a casing, a head detachably mounted therein and provided with an eye, a metallic member mounted within said casing and free to move relatively thereto, a sleeve provided with insulation and disposed partially within said casing, said insulation of said sleeve engaging said metallic bearing member, and a screw-bolt revolubly connected with said sleeve.

21. A turnbuckle-strain, comprising a casing, a head mounted therein and provided with an eye, a metallic bearing member having a substantially conical concave inner surface and outer bearing-surfaces mounted within said casing and free to move relatively thereto, a sleeve provided with insulation and disposed partially within said casing, said insulation of said sleeve engaging said metallic bearing member, and a screw-bolt revolubly connected with said sleeve.

22. A turnbuckle-strain, comprising a casing provided with slots, a head mounted within said casing and provided with fastening members engaging said slots, means for supporting said head, a metallic bearing member mounted within said casing, and suspension mechanism having a head disposed within said casing for engaging said metallic bearing member.

23. A turnbuckle-strain, comprising a casing provided with slots, a head mounted within said casing and provided with fastening members engaging said slots, means for supporting said head, a metallic bearing member having a substantially conical inner surface and also having outer bearing-surfaces, said bearing member being mounted within said casing, and suspension mechanism having a head disposed within said casing for engaging said metallic bearing member.

24. A turnbuckle-strain, comprising a casing provided with slots, a head mounted within said casing and provided with fastening members engaging said slots, means for supporting said head, a bearing member having a substantially conical concave inner surface and outer bearing-surfaces mounted within said casing, and suspension mechanism having a head disposed within said casing for engaging said bearing member.

25. A turnbuckle-strain, comprising a two-part casing, a head mounted therein and free to adjust itself relatively thereto when subjected to strain, said head being provided with means for suspending said casing, a bearing member mounted within said casing, and suspension mechanism having a portion engaging said bearing member.

26. A turnbuckle-strain, comprising a two-part casing, a head mounted therein and free to adjust itself relatively thereto when subjected to strain, said head being provided with means for suspending said casing, a bearing member having a substantially conical concave inner surface and outer bearing-surfaces mounted within said casing, and suspension mechanism having a portion engaging said bearing member.

27. A turnbuckle-strain, comprising a two-part casing provided with slots, a head mounted within said casing and free to adjust itself relatively thereto when subjected to strain, said head being provided with fastenings for engaging said slots, a bearing member mounted within said casing and free to adjust itself relatively thereto when subjected to strain, and suspension mechanism provided with a portion for engaging said bearing member.

28. A turnbuckle-strain, comprising a two-part casing provided with slots, a head mounted within said casing and free to adjust itself relatively thereto when subjected to strain, said head being provided with fastenings for engaging said slots, a bearing member having a substantially conical concave inner surface and outer bearing-surfaces mounted within said casing and free to adjust itself relatively thereto when subjected to strain, and suspension mechanism provided with a portion for engaging said bearing member.

29. A turnbuckle-strain, comprising a casing, means for suspending the same, a metallic ring mounted within said casing and provided with bearing-surfaces for engaging the same, said ring being free to move relatively to said casing and being further provided with a concave bearing-surface of substantially conical form, and insulated suspension mechanism provided with an enlarged head of substantially convex form for engaging said metallic ring.

30. A turnbuckle-strain, comprising a casing, means for suspending the same, a metallic ring mounted within said casing and provided with bearing-surfaces for engaging the same, said ring being free to move relatively to said casing and being further provided with an inner concave bearing-surface, an insulated sleeve provided with an enlarged head of substantially convex form for engaging said inner concave bearing-surface of said metallic ring, and an insulated suspension member connected with said insulated sleeve.

31. A turnbuckle-strain, comprising a casing, means for suspending the same, a metallic ring mounted within said casing and provided with bearing-surfaces for engaging the same, said ring being free to move relatively to said casing, and being further provided with a concave bearing-surface of substantially conical form, a hollow sleeve provided internally with a thread, and provided with a head of substantially conical form, insulation mounted upon said head and free to engage said metallic ring, and a bolt connected with said sleeve for suspending the same.

32. A turnbuckle-strain, comprising a casing, an insulated member for suspending the same, a metallic ring mounted within said casing and provided with bearing-surfaces for engaging the same, said ring being free to move relatively to said casing, and being further provided with an inner concave bearing-surface of substantially conical form, a hollow sleeve provided internally with a thread, and provided with a head of substantially conical form, insulation mounted upon said head and free to engage said substantially conical inner bearing-surface of said ring, and an insulated eyebolt connected with said sleeve for suspending the same.

33. A turnbuckle-strain comprising a casing, means for suspending the same, a metallic ring mounted within said casing and provided with bearing-surfaces for engaging the same, said ring being free to move relatively to said casing, and being further provided with a concave bearing-surface of substantially conical form, a hollow sleeve provided internally with a thread and provided with a head of substantially conical form, insulation mounted upon said head and free to engage said substantially conical bearing-surface of said ring, and an eyebolt connected with said sleeve, said bolt being provided with insulation.

34. A turnbuckle-strain comprising a casing, means for suspending the same, a metallic ring mounted within said casing and provided with bearing-surfaces for engaging the same, said ring being free to move relatively to said casing, and being further provided with an inner concave bearing-surface of substantially conical form, a hollow sleeve provided internally with a thread and provided with a head of substantially conical form, insulation mounted upon said head and free to engage said substantially conical inner bearing-surface of said ring, and an eyebolt connected with said sleeve.

35. A turnbuckle-strain, comprising a casing, a head mounted therein and provided with means for suspending the same, a bearing member having a substantially conical concave inner surface and outer bearing-surfaces, mounted within said casing, screw mechanism provided with a head, insulation mounted rigidly upon said head and engaging said bearing member, said screw mechanism having an eye, and insulation covering said eye.

36. A turnbuckle-strain, comprising a casing, an eye connected therewith for suspending the same, a separate metallic bearing member mounted within said casing, screw mechanism provided with a head, insulation mounted rigidly upon said head and engaging said separate metallic bearing member, said screw mechanism having an eye, and insulation covering said eye.

37. A turnbuckle-strain, comprising a casing, a head mounted therein and provided with means for supporting the same, an annular metallic bearing member disposed within said casing and free to revolve relatively thereto, said bearing member being separate from said casing and being provided with a concave inner bearing-surface of substantially conical form and with outer bearing-surfaces, a sleeve disposed partially within said casing and provided with a head of substantially conical form, a shell of insulating material mounted rigidly upon said sleeve, and encircling said head, said shell being free to revolve relatively to said annular bearing member, and a bolt for engaging said sleeve.

In testimony whereof I have signed my name to this specification in the presence of two subscribing witnesses.

LOUIS STEINBERGER.

Witnesses:
WALTON HARRISON,
EVERARD BOLTON MARSHALL.